June 9, 1964  E. G. OVERLY  3,136,596
PROCESSING MACHINE
Filed Sept. 7, 1960  3 Sheets-Sheet 1
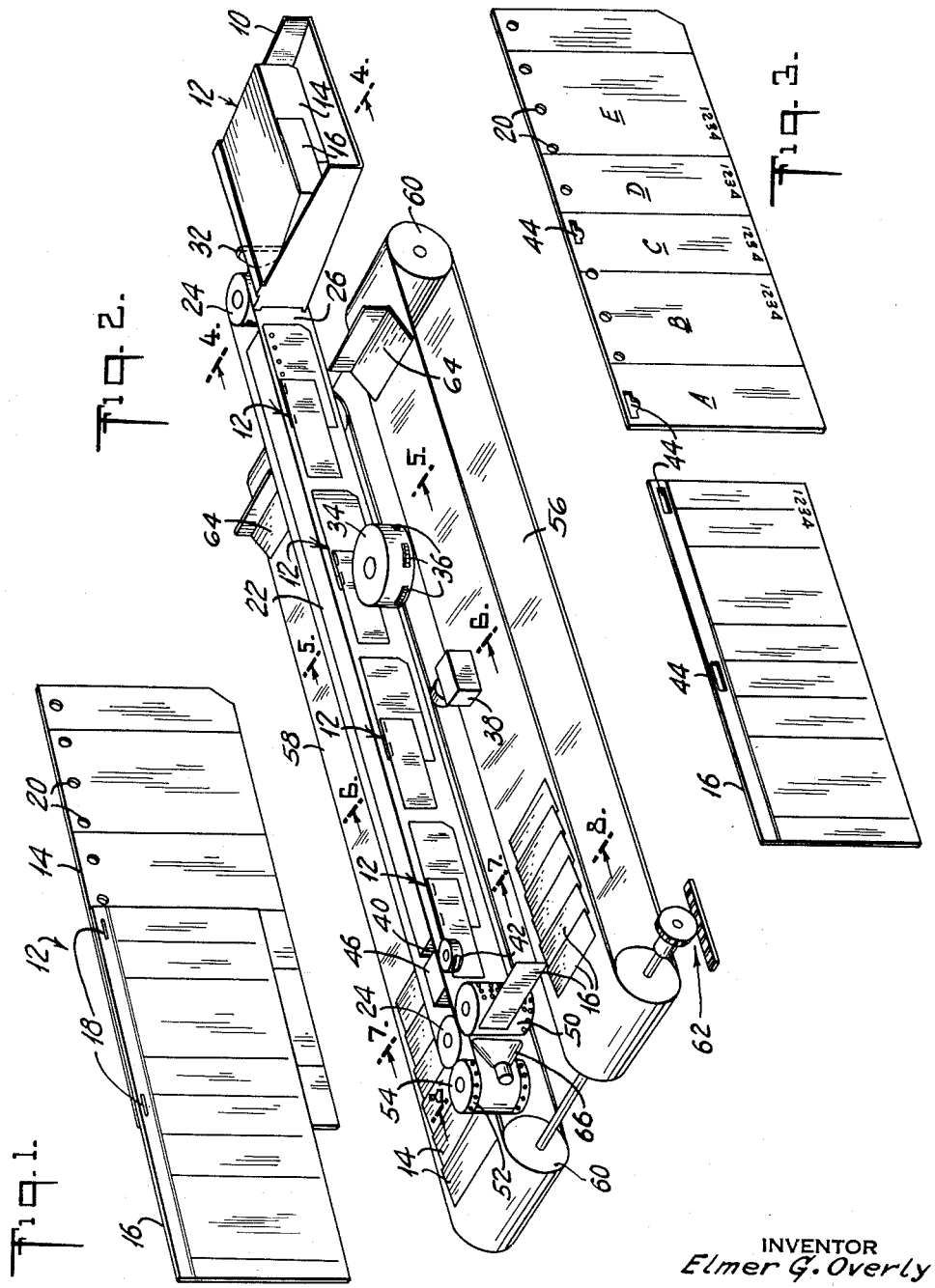
INVENTOR
*Elmer G. Overly*
BY
*Moses, Nolte & Nolte*
ATTORNEYS

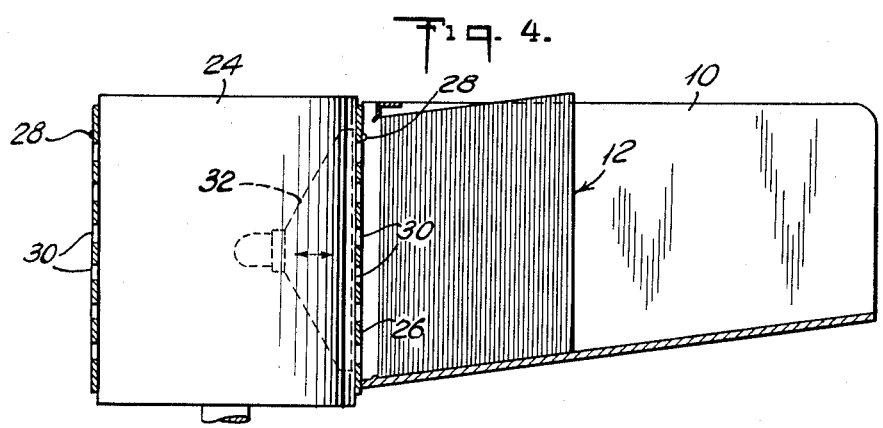
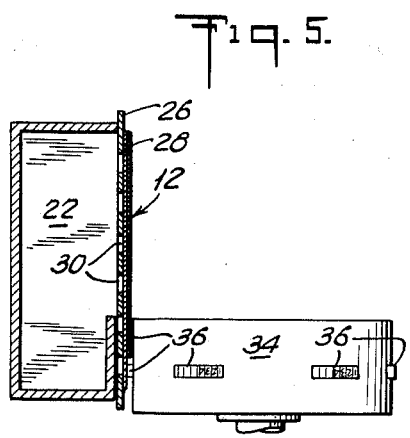
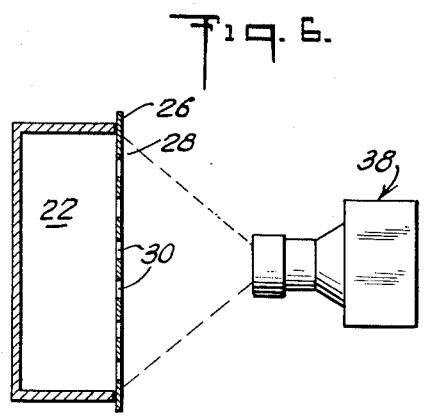
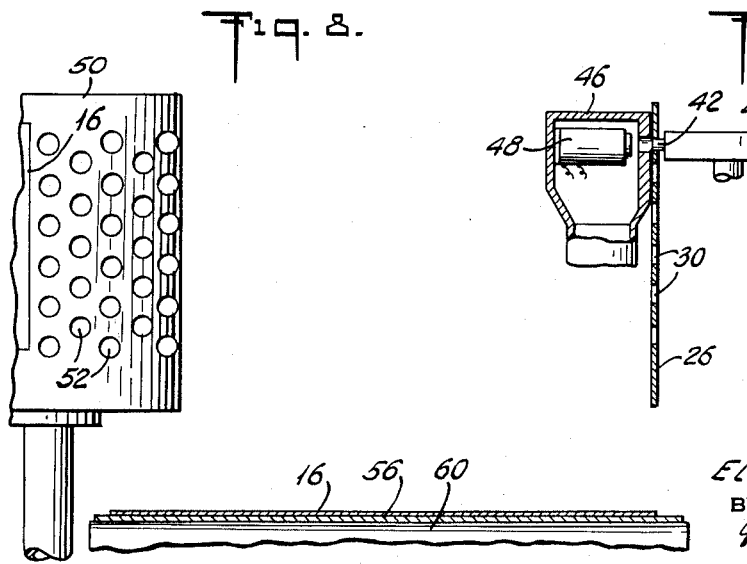

June 9, 1964  E. G. OVERLY  3,136,596
PROCESSING MACHINE
Filed Sept. 7, 1960  3 Sheets-Sheet 3
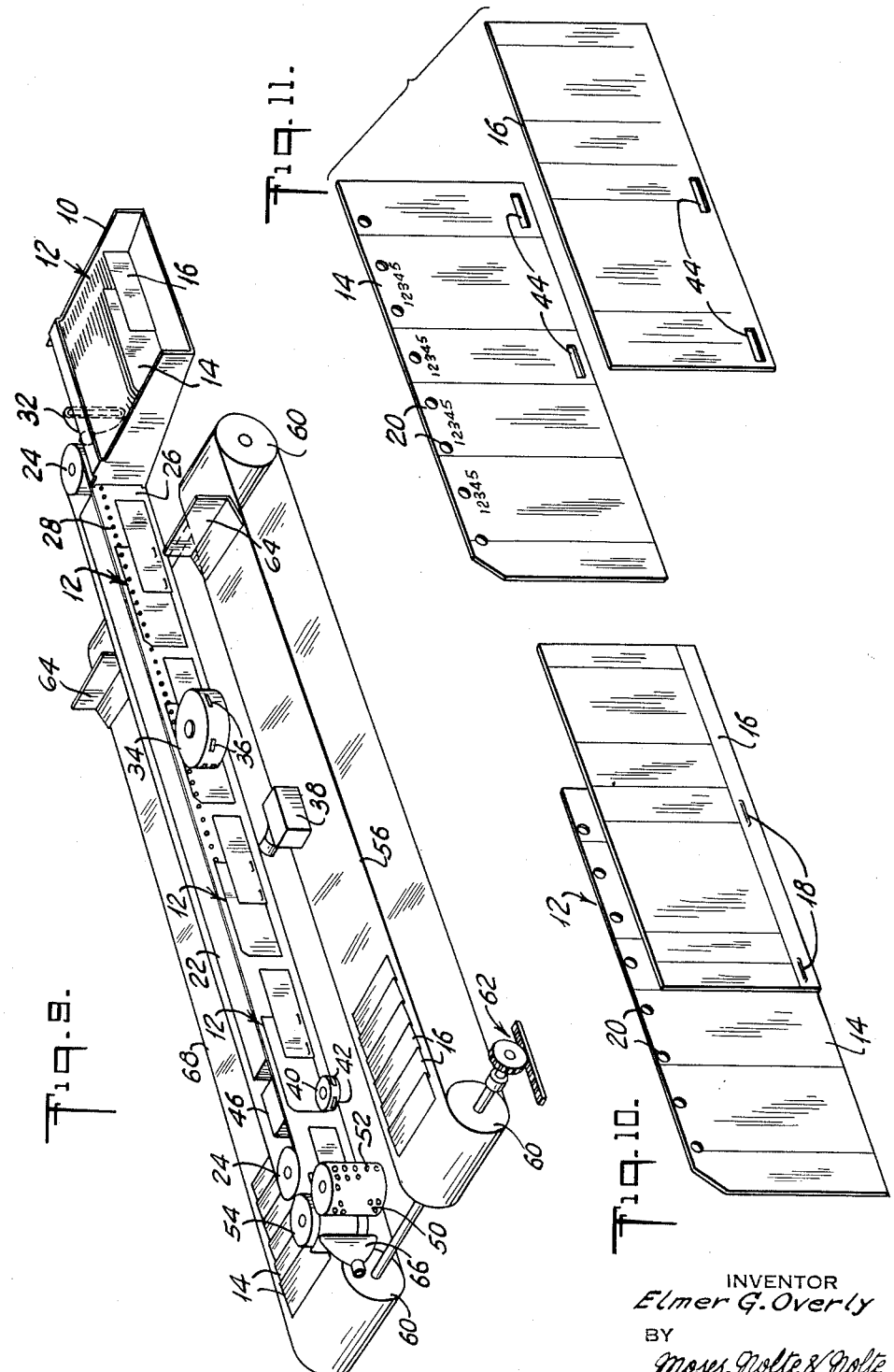
INVENTOR
Elmer G. Overly
BY
Moses, Nolte & Nolte
ATTORNEYS

United States Patent Office 3,136,596
Patented June 9, 1964

3,136,596
PROCESSING MACHINE
Elmer G. Overly, 7301 Penn Ave., Pittsburgh, Pa.
Filed Sept. 7, 1960, Ser. No. 54,385
13 Claims. (Cl. 346—107)

This invention relates to business machines in general and in particular to a novel machine for feeding groups of fastened sheets, applying serial numbers thereon, photographing the combined sheets and thereafter separating the sheets within a group into separate groups.

The present invention is particularly adaptable to procedures similar to the volume processing and issuing of driver's license or vehicle registration applications. In this type of application, a relatively stiff printed card is usually employed which contains a plurality of sections thereon containing duplicate information. These sections of the card are later separated into the individual license card while the other sections are separated and retained for the record keeping requirements of the issuing body. Each application card is accompanied by a monetary remittance usually in the form of a check, money order, or the like, and it is a purpose of this invention to print onto each section of the application card and onto the monetary remittance sheet a validating number and to permanently record the exact information contained on each of these sheets by photographing the remittance in combination with the associaed application card. The invention thereafter separates the payment sheet from the application sheet and neatly stacks them into separate groups. In this way it can be seen that the invention has, in a single operation, accomplished the validation and serialization of the various parts of the application form and at the same time has made a permanent record of the material contained upon the application form in combination with its associated payment check. With this procedure, any payment remittances that are not honored are easily traceable to the respective license issued or alternatively any alteration of the license from its "as issued" condition would be readily ascertainable by reference to the permanent photographic record of the license application. Because a complete processing record of the application is contained on photographic microfilm, considerable storage space savings may also be realized.

An object of the invention therefore is to provide a machine for the rapid processing of application forms comprised of various sheets held in secured fashion so that they may be number validated along with their respective remittance payments.

Another object of the invention is to provide an improved business machine which will transport secured groups of sheets along an extended path, identifyingly mark those sheets within each group, pictorially record the sheets as marked and thereafter separate the individual sheets in each group and place them in their respective stacks.

A still further object of the invention is to provide a unique transporting and separating means for groups of sheets secured together and traveling in a vertical plane.

Another object of the invention is to provide a rotary cutter operating in timed relation with respect to the position of the secured sheet groups upon a conveyor belt whereby severing of the sheets within the group is accomplished by the cutting of the area about the securing means.

Yet another object of the invention is to separate the sheets of each group into their respective stacks at the end of an extended conveyor path by the use of an air stream and a suction drum operating upon the leading sheet of each group of sheets.

Another object of the invention is to provide an improved feeding, separating and stacking means for multi-sheet groups.

A further object of the invention is to provide a machine for processing secured groups of sheets which is simple in design, reliable and rapid in operation, and economical to manufacture.

Other objects and advantages of the invention will become apparent and the invention will be fully understood from the following description and drawings in which:

FIG. 1 is a perspective view of a typical form processed by the invention;

FIG. 2 is a perspective view of the invention showing schematically the major operating parts thereof;

FIG. 3 is an exploded perspective view of the processed form after the staple securing means has been removed by the rotary cutter;

FIG. 4 is a cross sectional view of the hopper feed station taken along line 4—4 of FIG. 2;

FIG. 5 is a cross sectional view of the printing station taken along line 5—5 of FIG. 2;

FIG. 6 is a cross sectional view of the recording station taken along line 6—6 of FIG. 2;

FIG. 7 is a cross sectional view of the unfastening station taken along line 7—7 of FIG. 2;

FIG. 8 is a cross sectional view of the sheet separating station taken along line 8—8 of FIG. 2;

FIG. 9 is a view similar to FIG. 2 showing another embodiment of the invention;

FIG. 10 is a perspective view of the attached sheets to be processed by the embodiment of FIG. 9; and FIG. 11 is an exploded perspective view of the processed form after the staple securing means has been removed by the rotary cutter.

Referring to the drawings (FIGS. 1-8), the invention embodies a machine having a feed hopper 10 which holds a stack of combined remittance and multi-section cards 12 in a generally horizontal relation. Each combined group of sheets 12 comprises a relatively stiff multi-panel card 14 stapled in overlapping relation to a remittance sheet 16 which may be in the form of a check or a money order. These sheets are secured together by a pair of staples 18 along the aligned upper edges thereof. These staples have been previously oriented in accurate predetermined registration in relation to a plurality of spaced prepunched feed apertures 20 along an edge of the multi-section card 14. In one application of the invention, this multi-section card is a conventional operator's license application blank or automobile registration blank which usually contains a plurality of information panels labeled respectively A, B, C, D and E. These panels usually incorporate duplicate information and are later severed from the card 14 and sent to the various files and governmental agencies requiring their use, while one panel section is sent to the applicant to become his copy thereof. Usually each panel portion of a card will require a validating or serial number thereon so that future reference may be made on the basis of the license number rather than the operator's name.

Held in vertical relation between a pair of driving and support drums 24 is an endless feed belt 26 which contains a multiplicity of spaced apertures 30. This belt may be made of stainless steel or any other suitable flexible material. Along the upper edge of the belt 26 are a plurality of spaced card feed pins 28 (FIG. 4) which have spacing equivalent to the feed apertures 20 contained in the card. The feed pins 28 will engage the apertures 20 on the rearmost card 14 contained in the hopper stack as the belt rotates about its support drums 24. A suction head 32 of general fan shape is employed to aid the transfer of the end card from the hopper onto the belt feed pins. As soon as the multi-sheet form 12 has been transferred to the moving feed belt 26, it is held securely to the belt by an elongated vacuum or suction chamber 22 disposed within the belt loop. This suction chamber acts to provide a vacuum behind the apertures 30 and thereby secure each sheet group in contacting relation with the belt. As each form or group progresses down the extended path of the feed belt 26 a sequence of operations occurs. First, the printing station is reached wherein a rotating marking drum 34 is suitably positioned vertically with respect to the cards so that a validating license number or similar mark is stamped on the end of each panel portion of the card 14 and also upon a portion of the overlapping remittance or payment stub 16. In this way the payment sheet 16 associated with any application card 14 is similarly numbered. The marking drum 34 will be understood to contain a conventional sequencing mechanism which will advance the number printed one digit for each revolution of the drum so that successive groups will be sequentially numbered, each portion within the group bearing the same number.

A photographic recorder 38 permanently preserves the numbered remittance check and application card immediately after it has been printed by the marking drum 34. This photographic device can be any of the well known micro-filming or magnetic tape machines such as, for example, the Burroughs-Bell and Howell Microtwin sold by the Burroughs Corporation and the magnetic recording system disclosed in Patent Number 3,051,777, and is adapted to photograph the moving form 12 in rapid manner without the necessity of stopping the belt drive. Further on, in the extended path of the belt transport, a staple removing cutter 42 is supported on a rotary head 40 and driven about a vertical axis in similar manner as the marking drum 34 to cut a rectangular aperture 44 about each of the two staples which secure the sheets of the forms together. Because the position of the staples or other suitable securing means is accurately registered with respect to the apertures 20 in the card 14, the cutter 42 may be easily synchronized by conventional means (not shown) with the advancing staples on the belt supported sheets. The cutter 42 is of general rectangular shape and cuts through both sheets of the form by abutment against a suitable cut out portion in the supporting belt 26 (FIG. 7). The removal of the staple cut out portion is readily accomplished by the employment of a staple waste container 46 directly behind the cutter 42 while removal is aided by the electromagnetic attraction supplied by a coil 48. Of course, those skilled in the art will readily appreciate that staple removal could be accomplished otherwise either by suction in the cutter head 40 or alternatively in the stationary waste container 46.

Even though the sheet fastening securing staples have been removed, the sheets in each group will remain in their relative positions as the form advances toward a remittance take-off drum 50 at the end of the belt path. The take-off drum 50 is supplied with a suitable controllable internal suction source (not shown) which is vented to the atmosphere through apertures 52 in the outer periphery of the drum. As the drum rotates, the leading edge of the remittance form 16 will be held thereto and under continued take-off drum rotation will be directed substantially 90° about the drum at which time the vacuum will be reduced so that the remittance check 16 may fall to a moving conveyor belt 56 below the drum. Operating in cooperation with the controllable vacuum drum 50 employed to remove the remittance check 16 is an air jet 66 which is employed for deflecting the following card portion 14 of the group against and onto a second take-off drum 54. This card take-off drum also contains similar apertures 52, as those contained in the check take-off drum 50, and is also connected to a suitable controlled suction supply (not shown). As the card 14 advances about the periphery of the drum 54 the suction is released so that the card is deposited onto a second conveyor belt 58 at the rear of the machine after turning 90° on the drum 54. Of course, those skilled in the art will readily appreciate that sheet removal from the vacuum drums 50 and 54 may also be aided by using stationary suction aperture masking plates suitably positioned about each drum's periphery. The check conveyor belt 56 and the card conveyor belt 58 are made of any suitable flexible material and are supported upon horizontally disposed paired drums 60. A shaft extending from the drum 60 is suitably driven by a rack and pinion drive 62 which may be controlled in any desired manner to advance the conveyor belts 56 and 58 in unison. As the separated sheets of each group are placed on their respective belts and advanced toward the right end portion thereof, the machine operator may easily remove them from the belt by manual means or may choose to let them accumulate against a pair of stack plates 64.

Referring to FIGS. 9 to 11, an alternate embodiment of the invention is shown wherein the card 14 is secured to the remittance check 16 along their lower edges by staples 18. In this embodiment the combined check and remittance card 12 are placed in the hopper 10 in such a fashion that the card 14 will lead the remittance check 16 as they pass along the path of the conveyor 26. In this embodiment, as in the previous embodiments, the groups of cards are held against the conveyor belt by a vacuum chamber 22 working through suction apertures 30 in the belt 26. Each group of attached forms 12 is advanced along the belt path in timed relation with a printing drum 34, a recording camera 38 and a rotating cutter head 40 by a plurality of belt feed pins 28 in engagement with the card apertures 20 along the upper edge of the card 14. The printing drum contains type sections 36 which suitably imprint each panel section of the card 14 and a portion of the remittance check 16 with an identifying number. The cutter 40 in this embodiment is in a lower position than in the previous embodiment in order to remove the staples from the lower portion of card groups in similar fashion as in the previous embodiment. At the end of the conveyor path are two rotating transversely aligned suction drums 50 and 54 which operate to separate and divert each card to its respective conveyor belt. Because the rearmost card 14 is leading the remittance check 16, it is diverted by an air blast from jet 66 against the suction drum 54. As the drum 54 continues to rotate, the card 14 is diverted and deposited upon the rear conveyor belt 68. The associated remittance check 16 will adhere to the vacuum drum 50 because of the masking of the vacuum in the drum 54 by the rearward portion of the card 14. This allows the remittance check 16 to follow the contour of the rotating drum 50 in order to deflect it and deposit it upon the front conveyor belt 56 in similar fashion as in the previous embodiment. Of course, those familiar in the art will readily appreciate that each of the cards may be removed from its respective drum by any of various well known methods such as a timed interruption of the vacuum within the drum by a conventional rotary valve within the drum axis, or in lieu thereof by a deflection plate about the periphery of the drum (not shown).

In operation the invention will provide an economical and rapid labor saving way of processing large numbers of similar application forms. The operator need only place pre-fastened remittances, with their respective application cards, in the feed hopper and remove the numbered, photographed, and separated forms and checks from their respective take-off conveyor belts. The machine will thus be seen to have automatically sequentially numbered the respective portions of both the license card and also will have placed a similar identifying number on the remittance payment. Because a photograph of the combined sheets of each form is made, considerable storage space economies are effected.

Although the embodiments show the cards 14 including spaced apertures 20 in engagement with pins 28 in the belt, it should be understood that belt to card registration and timing may be maintained in other conventional ways employing electronic scanning of magnetic ink reference marks upon the cards, conductive ink, or photo-electric methods.

While specific embodiments of the invention have been shown and described in detail to illustrate the application of the invention principles, it will be understood that the invention may be embodied otherwise without departing from such principles.

What I claim is:

1. A machine for processing groups of attached sheets, each group having at least a pair of sheets fastened together in a lapped relation, comprising feed means for holding a plurality of groups in stacked relation, conveyor means for removing the groups one at a time from said feed means and transporting them in serial relation along an extended path, marking means along said conveyor means to imprint identification characters on selected portions of each sheet within each group, image recording means to record the lapped relationship of each group of attached sheets, said recording means being located along said conveyor means, separating means for unfastening said attached lapped sheets and means for depositing the separated sheets into respective stacks.

2. Apparatus according to claim 1, wherein said recording means is located along the conveyor means extended path between the marking means and the separating means.

3. Apparatus according to claim 1, including in addition, paired horizontally disposed conveyor accumulating means on either side of said conveyor means adapted to receive the separate stacks of unfastened sheets, and means to drive said conveyor accumulating means.

4. A machine for processing groups of attached sheets, each group having at least a pair of sheets fastened together with staples in overlapping relation, at least one of the sheets having perforations therein, comprising a feed hopper for holding a plurality of groups in stacked relation, an endless conveyor belt having a plurality of spaced apertures therein for transporting the groups along an extended path, first suction means for advancing single groups in sequence from said hopper to said conveyor belt, means protruding from said conveyor belt to engage the sheet perforations, second suction means operating through said conveyor belt apertures to hold the sheets in contact with said conveyor belt during travel along said extended path, marking means along said conveyor belt to print each sheet in each group with an identifying number, photographic means along said conveyor belt to permanently record the relationship of the sheets within each group, cutting means to sever the sheet material about the staples thereby separating the staples from the sheets, separating means at the end of said conveyor means for diverting one of the sheets of each group in one direction and the other sheet in another direction, and receiving means for grouping the separated sheets at the end of said conveyor means extended path.

5. Apparatus according to claim 4, wherein said separating means includes a pair of rotating controllable suction drums in staggered relation at the end of said conveyor means extended path and air directing means between said suction drums to deflect one of said sheets toward one of said suction drums.

6. A machine for processing groups of attached sheets comprising feed means adapted to receive a multiplicity of groups of sheets in stacked relation, each of said groups including two sheets fastened together in partial lapped relation, conveyor means for removing the groups one at a time from said feed means and advancing them in serial relation along an extended path, marking means along said conveyor means to imprint identification characters on selected portions of each sheet within said groups, image recording means to record the marked sheets within each group in its said partial lapped relation, said recording means being located along said conveyor means, separating means for unfastening said attached lapped sheets and means for depositing the separated sheets into respective stacks.

7. Apparatus according to claim 6, wherein said sheet having all its area in contact with said conveyor means is the leading sheet in each group of attached sheets moving along said conveyor means.

8. An apparatus according to claim 1, wherein said image-recording means comprises photographic means.

9. An apparatus according to claim 1, wherein said image-recording means comprises magnetic tape image-recording means.

10. An apparatus according to claim 6, wherein said image-recording means comprises photographic means.

11. An apparatus according to claim 6, wherein said image-recording means comprises magnetic tape image-recording means.

12. An apparatus according to claim 1, wherein said feed means includes a hopper.

13. An apparatus according to claim 6, wherein said feed means includes a hopper.

References Cited in the file of this patent

UNITED STATES PATENTS

| | | |
|---|---|---|
| 2,905,309 | Makrides | Sept. 22, 1959 |
| 2,923,587 | Zipf | Feb. 2, 1960 |
| 2,936,684 | Simjian | May 17, 1960 |